United States Patent [19]
Ziel et al.

[11] Patent Number: 5,562,142
[45] Date of Patent: Oct. 8, 1996

[54] BIG DASH SHIELD AND SEAT SHIELDS

[76] Inventors: Georgianna Ziel, 2268 Richmond Ter., Staten Island, N.Y. 10302-1244; George Spector, 233 Broadway Room 702, New York, N.Y. 10279

[21] Appl. No.: 395,861

[22] Filed: Feb. 28, 1995

[51] Int. Cl.⁶ ........................................ B60J 3/00
[52] U.S. Cl. ................ 160/370.21; 160/89; 160/180
[58] Field of Search ................ 160/370.21, 370.22, 160/370.23, 84.07, 368.1, 89, 116, 180; 296/97.1, 97.4, 97.6, 97.7, 97.8, 143

[56] References Cited

U.S. PATENT DOCUMENTS

| | | | |
|---|---|---|---|
| 4,560,245 | 12/1985 | Sarver | 160/370.21 X |
| 4,790,591 | 12/1988 | Miller | 296/97.7 X |
| 4,877,074 | 10/1989 | Castellano | 296/97.8 X |
| 4,883,304 | 11/1989 | Elliott | 296/97.8 |
| 5,064,239 | 11/1991 | Folcik | 296/97.7 |
| 5,115,848 | 5/1992 | Malone | 160/370.21 X |
| 5,379,822 | 1/1995 | Lenetz | 160/370.21 |

*Primary Examiner*—Blair Johnson
*Attorney, Agent, or Firm*—Salvatore C. Mitri

[57] ABSTRACT

A sun shield for a motor vehicle comprising three flexible panels sized in the shape of a windshield and two side window assemblies of the motor vehicle. The flexible panel of the windshield has a vertical central top slit to accommodate a rearview mirror holder. A plurality of VELCRO fasteners are for securing the three flexible panels at their perimeters about an interior frame of the windshield and the two side window assemblies, so as to cover the windshield and the two side window assemblies, to block out sunlight and reflected heat from entering the motor vehicle through the windshield and the two side window assemblies.

6 Claims, 1 Drawing Sheet

BIG DASH SHIELD AND SEAT SHIELDS

BACKGROUND OF THE INVENTION

The instant invention relates generally to motor vehicle privacy curtains and more specifically it relates to a sun shield, which provides a covering for a windshield and side windows of a motor vehicle, that blocks out all sunlight and reflected heat.

There are available various conventional motor vehicle privacy curtains which do not provide the novel improvements of the invention herein disclosed.

SUMMARY OF THE INVENTION

A primary object of the present invention is to provide a sun shield that will overcome the shortcomings of the prior art devices.

Another object is to provide a sun shield that is a covering for a windshield and side windows of a motor vehicle that will block out all sunlight and reflected heat from entering the motor vehicle.

An additional object is to provide a sun shield that will prevent the sunlight from fading and drying out the materials on the dashboard and seats in the motor vehicle.

A further object is to provide a sun shield that is simple and easy to use.

A still further object is to provide a sun shield that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
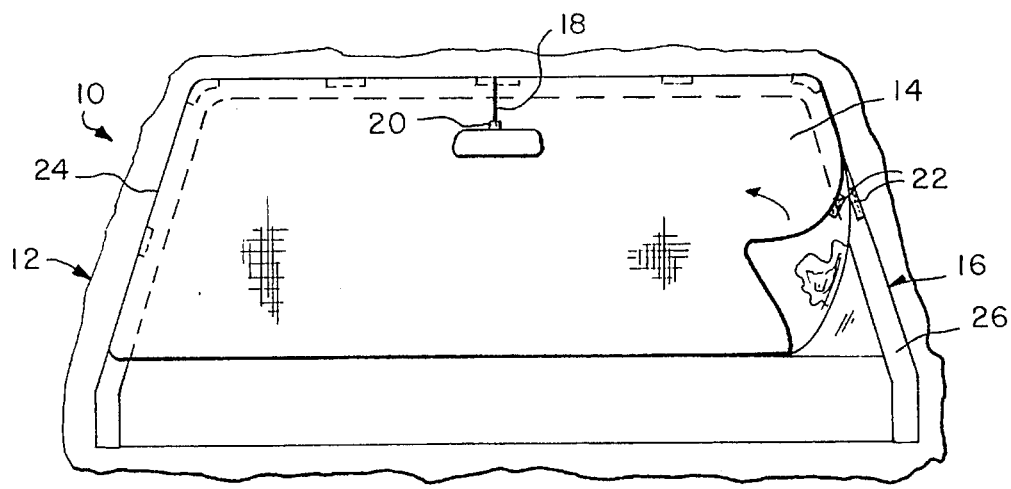
FIG. 1 is a diagrammatic interior elevational view of a windshield of a motor vehicle with one form of the instant invention installed in place.

Turning now descriptively to the drawings, in which similar reference characters denote similar elements throughout the several views, FIG. 1 illustrates a sun shield 10 for a motor vehicle 12, comprising a flexible panel 14 sized in the shape of a windshield 16 of the motor vehicle 12.

The flexible panel 14 has a vertical central top slit 18 to accommodate a rearview mirror holder 20. A plurality of VELCRO fasteners 22 are for securing the flexible panel 14 at its perimeter 24 about an interior frame 26 of the windshield 16, so as to cover the windshield 16 to block out sunlight and reflected heat from entering the motor vehicle 12 through the windshield 16.

Figure 2:
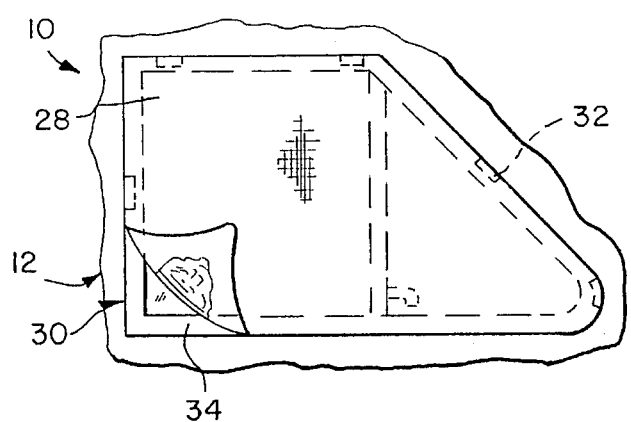
FIG. 2 is a diagrammatic interior elevational view of a side window assembly of the motor vehicle with another form of the instant invention installed in place.

The sun shield 10 further includes a pair of additional flexible panels 28, each sized to the shape of a side window assembly 30 of the motor vehicle 12. One of which is shown in FIG. 2. A plurality of VELCRO fasteners 32 are for securing each of the additional flexible panels 28 about an interior frame 34 of each side window assembly 30, so as to cover each side window assembly 30 to block out sunlight and reflected heat from entering the motor vehicle 12 through each side window assembly 30.

Figure 3:
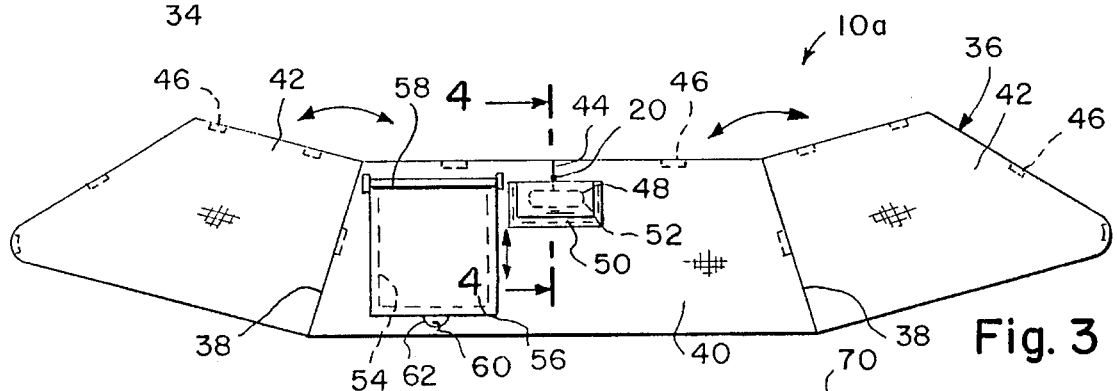
FIG. 3 is an elevational view of a modification of the instant invention being a one piece unit with its three segments hinged together, to cover the windshield and side windows of the motor vehicle.
Figure 4:
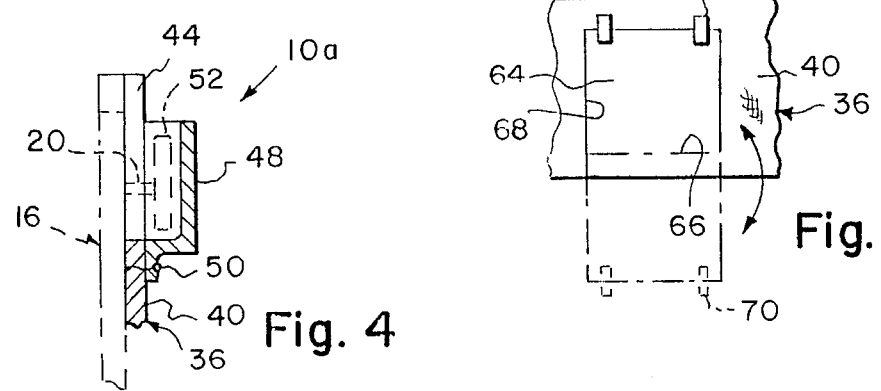
FIG. 4 is an enlarged cross sectional view taken along line 4—4 in FIG. 3, showing the pocket for the mirror in greater detail.

FIG. 3 shows a modified sun shield 10a for a motor vehicle 12, consisting of a flexible panel 36 sized to the shape of a windshield 16 and two side window assemblies 30 of the motor vehicle 12. The flexible panel 36 has two side hinge fold lines 38 for dividing the flexible panel into a windshield segment 40 and two side window assembly segments 42. The windshield segment 40 has a vertical central top slit 44 to accommodate a rearview mirror holder 20. A plurality of VELCRO fasteners 46 are for securing the windshield segment 40 to an interior frame 26 of the windshield 16, and the side window assembly segments 42 to interior frames 34 of the side window assemblies 30. As best seen in FIG. 4, a pocket 48 is affixed at 50 to the windshield segment 40 of the flexible panel 36 adjacent the vertical central top slit 44, to cover the rearview mirror 52.

The windshield segment 40 of the flexible panel 36 has a window 54 at the driver's side thereof. An emergency window shade 56 is provided. A spring biased open roller 58 is mounted above the window 64 on the windshield segment 40, which will keep the emergency window shade 56 open to allow the driver to see through the window 54, when the need arises. A hook 60 is mounted below the window 54 on the windshield segment 40. A loop 62 is on a free end of the emergency window shade 56. When the emergency window shade 56 is pulled down, the loop 62 can engage with the hook 60 to keep the emergency window shade 56 closed over the window 54, as shown in FIG. 3.

Figure 3A:
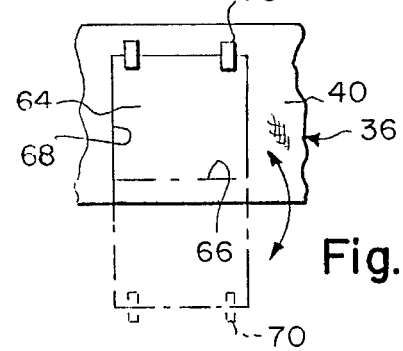
FIG. 3A is a partial elevational view, showing an alternate construction using a fold down flap instead of the emergency shade in FIG. 3.

FIG. 3A shows the windshield segment 40 of the flexible panel 36 having a flap 54 in the driver's side with a lower hinge fold line 66, thereby forming a window 68. A plurality of VELCRO fasteners 70 are for keeping the flap 64 closed in the window 68. When the flap 64 is pulled down, the driver can see through the window 68 when the need arises.

The exterior surfaces of the flexible panels 14, 28 and 36 can contain a design color, or picture 72, to enhance their appearance. The sun shields 10 and 10a can be used for any type of motor vehicle 12, but especially for all recreational vehicles, such as vans, campers, trailers and motor homes.

OPERATION OF THE INVENTION

To install the flexible panel 14 of the sun shield 10 to the windshield 16, a person simply takes a first set of VELCRO fasteners 22 and attaches them about the interior frame 26 of the windshield 16 with adhesive. The second set of VELCRO fasteners 22 on the flexible panel 14 can now be pressed against the matching first set of VELCRO fasteners 22. The additional flexible panels 28 can be installed to the side window assemblies 30 with the first and second sets of VELCRO fasteners 32 in the same manner as the flexible panel 14. The flexible panel 36 of the sun shield 10a can also be installed to the windshield 16 and the side window assemblies 30, with the first and second sets of VELCRO fasteners 46 in the same manner as the flexible panels 14 and 28.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A sun shield for a motor vehicle comprising:
   (a) a flexible panel sized to the shape of a windshield of a motor vehicle and having a vertical central top slit to accommodate a rearview mirror holder;
   (b) a window formed in said flexible panel at the driver's side thereof;
   (c) an emergency window shade for said formed window having a spring biased open roller mounted above said formed window enabling said emergency window shade to be kept open permitting a driver to see through said window when the need arises;
   (d) a hook mounted below said formed window on said flexible panel;
   (e) a loop mounted on the free end of said emergency window shade positioned to engage said hook enabling said emergency window shade to be kept closed over said window when said emergency window shade is pulled down; and,
   (f) a plurality of VELCRO fasteners attached to the perimeter of said flexible panel and a plurality of mating VELCRO fasteners adapted to be attached to the interior frame of the windshield of said motor vehicle for securing said flexible panel to said interior frame.

2. The sun shield of claim 1 which includes a pocket affixed to said flexible panel adjacent said vertical central top slit to cover said rearview mirror.

3. The sun shield of claim 1 wherein a flexible side panel is hingeably secured to each side of said flexible panel to form a continuous, one-piece sun shield assemblage, said flexible side panel being sized to the shape of the side window assembly of said motor vehicle; and, a plurality of VELCRO fasteners attached to the perimeter of said flexible side panel and a plurality of mating VELCRO fasteners adapted to be attached to the interior frame of said side window assembly for securing said flexible side panel to said side window assembly.

4. A sun shield for a motor vehicle comprising:
   (a) a flexible panel sized to the shape of a windshield of a motor vehicle and having a vertical central top slit to accommodate a rearview mirror holder;
   (b) a flap formed in the driver's side of said flexible panel having a lower hinge fold line such that a window is created in said flexible panel;
   (c) a plurality of VELCRO fasteners secured to the perimeter of said formed flap and a plurality of mating VELCRO fasteners secured to said flexible panel for keeping said flap in a closed position such that when said flap is pulled down, a driver can see through said window when the need arises; and,
   (d) a plurality of VELCRO fasteners attached to the perimeter of said flexible panel and a plurality of mating VELCRO fasteners adapted to be attached to the interior frame of the windshield of said motor vehicle for securing said flexible panel to said interior frame.

5. The sun shield of claim 4 which includes a pocket affixed to said flexible panel adjacent said vertical central top slit to cover said rearview mirror.

6. The sun shield of claim 4 wherein a flexible side panel is hingeably secured to each side of said flexible panel to form a continuous, one-piece sun shield assemblage, said flexible side panel being sized to the shape of the side window assembly of said motor vehicle; and, a plurality of VELCRO fasteners attached to the perimeter of said flexible side panel and a plurality of mating VELCRO fasteners adapted to be attached to the interior frame of said side window assembly for securing said flexible side panel to said side window assembly.

* * * * *